United States Patent [19]
Kask et al.

[11] Patent Number: 6,122,098
[45] Date of Patent: Sep. 19, 2000

[54] CONFOCAL MICROSCOPE FOR OPTICAL DETERMINATION OF AN OBSERVATION VOLUME

[75] Inventors: Peet Kask, Harku, Estonia; Stefan Hummel, Wedel, Germany

[73] Assignee: Evotec Biosystems A.G., Hamburg, Germany

[21] Appl. No.: 09/202,333
[22] PCT Filed: Jun. 11, 1997
[86] PCT No.: PCT/EP97/03022
  § 371 Date: Dec. 11, 1998
  § 102(e) Date: Dec. 11, 1998
[87] PCT Pub. No.: WO97/48001
  PCT Pub. Date: Dec. 18, 1997

[30] Foreign Application Priority Data

Jun. 11, 1996 [DE] Germany .................. 196 23 230

[51] Int. Cl.[7] .................. G02B 21/00; G02B 26/10
[52] U.S. Cl. .................. 359/368; 359/202; 359/213; 359/385
[58] Field of Search .................. 359/368, 202, 359/213, 214, 225, 389, 385

[56] References Cited

U.S. PATENT DOCUMENTS

| | | |
|---|---|---|
| 3,764,192 | 10/1973 | Wheeler . |
| 5,048,904 | 9/1991 | Montagu . |
| 5,225,923 | 7/1993 | Montagu . |
| 5,329,352 | 7/1994 | Jacobsen .................. 356/301 |
| 5,381,224 | 1/1995 | Dixon et al. .................. 356/72 |

FOREIGN PATENT DOCUMENTS

| | | |
|---|---|---|
| 0508257A2 | 10/1992 | European Pat. Off. . |
| 96 11420 | 4/1996 | WIPO . |

*Primary Examiner*—Jon Henry

[57] ABSTRACT

A confocal microscope for optical detection of an observation volume includes a light source, a dichroic mirror, and an objective lens arrangement which further includes a mechanical aperture and an observation optic arrangement. Between the dichroic mirror and the objective lens arrangement, a deflection mirror arrangement is located having a planar deflection mirror on the side of the objective which is arranged to oscillate about a normal position. The objective-side deflection mirror is designed so that, upon oscillation of the objective-side mirror, optical axes of the reflected excitation light intersect in a substantially common intersection in the area of the mechanical aperture of the objective lens arrangement, and so that, when the objective-side deflection mirror is in its normal position the oscillation axis of the objective-side deflection mirror coincides with the line of intersection of the plane in which the objective-side deflection mirror lies, and a plane extending through the common intersection of the optical axes of the reflected excitation light which is perpendicular to the optical axis of the reflected light.

22 Claims, 3 Drawing Sheets

CONFOCAL MICROSCOPE FOR OPTICAL DETERMINATION OF AN OBSERVATION VOLUME

This application is the national phase under 35 U.S.C. §371 of prior PCT International Application No. PCT/EP97/03022 which has an International filing date of Jun. 11, 1997 which designated the United States of America.

FIELD OF THE INVENTION

The invention relates to a confocal microscope for optical detection of an observation volume, as used, in particular, in fluorescence spectroscopy.

RELATED ART

A confocal microscope adapted to optically determine processes taking place in an observation volume is known from PCT/EP94/00117. This known microscope is employed in particular in fluorescence correlation spectroscopy (FCS). The known microscope comprises a light source, which, in particular, is a laser light source, generating a laser light beam. The laser light beam impinges on a dichroic mirror, possibly after being conditioned by a lens arrangement, which mirror reflects the light towards an objective lens arrangement having a mechanic aperture and focusing the light onto the observation chamber. The laser light entering the observation chamber excites fluorescence in, for example, a biological sample within the observation volume, depending on the composition thereof. The resulting fluorescent light reaches the objective lens arrangement from where it passes through the dichroic mirror to impinge on an observation optic arrangement with which the processes in the observation volume may be optically determined.

The known confocal microscope has proven generally successful in practice. However, depending on the samples to be studied, relatively long examination periods are required to observe the generation of fluorescent light in the sample and to collect a sufficient amount of (optical) data that would allow for a quantitative evaluation of the processes happening in the sample.

SUMMARY OF THE INVENTION

It is the object of the invention to provide a confocal microscope for optical detection of an observation volume to be used in fluorescence spectroscopy, which microscope allows for an optical detection of samples in a shorter period of time.

According to the invention, the object is solved with a confocal microscope provided with a light source for generating excitation light, a dichroic mirror reflecting the excitation light impinging thereon from the light source, an objective lens arrangement with a mechanical aperture, receiving the excitation light reflected by the dichroic mirror and focusing the light on the observation volume, and an observation lens arrangement receiving light coming from the observation volume and passing through the dichroic mirror.

According to the invention, this confocal microscope is characterized in that between the dichroic mirror and the objective lens arrangement, a deflection mirror arrangement is located having a planar deflection mirror at the side of the objective, which mirror is arranged to oscillate about a normal position, such that upon oscillation of the objective-side mirror, the optical axes of the respective reflected excitation light intersect in a substantially common intersection in the area of the mechanical aperture of the objective lens arrangement, and the oscillation axis of the objective-side deflection mirror coincides with the line of intersection of the plane, in which the objective-side deflection mirror lies, and the plane extending through the common intersection of the optical axes of the reflected excitation light and perpendicular to the optical axis of the reflected light, when the objective-side deflection mirror is in its normal position.

The present confocal microscope is provided with a deflection mirror arrangement comprising at least one deflection mirror (on the side of the objective). This objective-side deflection mirror is arranged for oscillation about a normal position. Oscillating this deflection mirror, the angle under which the excitation light impinges on the objective lens arrangement is varied. Here, the invention provides that the excitation light is moved in the mechanical aperture of the objective lens arrangement such that the beam of excitation light is at the center of the mechanical aperture under any angle of incidence. In other words: upon oscillation of the objective-side deflection mirror, the optical axes of the respective reflected excitation light intersect at a substantially common intersection that lies within the area of the mechanical aperture and is situated, in particular in the propagation direction of the excitation light, behind the mechanical aperture of the objective lens arrangement. Here, the axis about which the objective-side deflection mirror oscillates coincides with the line of intersection of the plane, in which the planar objective-side deflection mirror lies, and the plane extending through the common intersection of the optical axes of the respective reflected excitation light and running vertical to the optical axis of the reflected excitation light, when the objective-side deflection mirror is in the normal position.

With the present microscope, expanded light beams of larger diameter may be coupled into the objective lens arrangement without parts of the profile of the excitation light beam being cut off when the angle of incidence is changed. According to the invention, this is achieved by merely providing a planar deflection mirror, i.e., specifically, no sophisticated optic elements are required. The deflection mirror of the deflection mirror arrangement has an oscillation drive and preferably oscillates to up to 5°, preferably up to 3° and in particular by 2°, on both sides of its normal position. Suitable oscillation drives are generally known in the art.

In the present microscope, the excitation optic between the observation volume and the dichroic mirror also forms part of the detection optic which is completed by the observation optic arrangement arranged behind the dichroic mirror. Thus, the present microscope is a truly confocal system.

Preferably, the deflection mirror arrangement of the present confocal microscope is a back-up optic for existing confocal microscopes that may be added to these without necessitating an intervention with the optical structure of the existing microscope. As a rule, the existing confocal microscope has an expanded and collimated excitation light beam that may be coupled directly into the objective via the deflection mirror arrangement. To this end, the deflection mirror arrangement merely has to be screwed into the (barrel) opening of the standing microscope. The objective lens arrangement of the existing microscope is mounted directly to the deflection mirror arrangement itself.

Using a deflection mirror makes it possible to reciprocally move the excitation light reflected by the objective lens arrangement in one dimension, i.e. linearly, back and forth through the sample. In order to move the observation volume (i.e., the focused excitation light) two-dimensionally through the sample, a preferred embodiment of the invention provides for the additional use of a deflection mirror on the side of the light source, which is arranged between the objective-side deflection mirror and the dichroic mirror. The deflection mirror on the side of the light source also oscillates about a normal position such that when the deflection mirror on the side of the light source is oscillated, the optical axes of the respective reflected excitation light intersect approximately in a substantially common intersection situated in the area of the plane of the objective-side deflection mirror. Both deflection mirrors oscillate about mutually rectangular oscillation axes, the oscillation axis of the deflection mirror on the side of the light source coinciding with the line of intersection of the plane of the deflection mirror on the side of the light source and the plane extending through the common intersection of the optical axes of the reflected excitation light and vertical to the optical axis of the reflected light, when the deflection mirror on the side of the light source is in its normal position. Using two deflection mirrors oscillating about mutually vertical axes, the focused light may be moved through the sample in a plane, i.e. two-dimensionally.

The essential aspect of the present confocal microscope is that by the special arrangement of the oscillation axes of the deflection mirrors, it is achieved that the excitation light impinges in the mechanical aperture of the objective light arrangement under any angle of incidence, without cutting parts of the excitation light beam off. According to the invention, only planar deflection mirrors are used, i.e. mirrors of simple structure. These deflection mirrors may be round or elliptic mirrors. In the latter case, the edges may be rounded or polygonal. When elliptic deflection mirrors are used that each have a longitudinal axis and a normal axis extending vertical thereto, the two deflection mirrors are preferably arranged such that its longitudinal axes are shifted relative to each other by 90° and intersect under an angle of 45°.

BRIEF DESCRIPTION OF THE DRAWINGS

The following is a detailed description of an embodiment of the invention taken in conjunction with the drawings. In the Figures.

DETAILED DESCRIPTION OF THE PREFERRED EMBODIMENT

Figure 1:
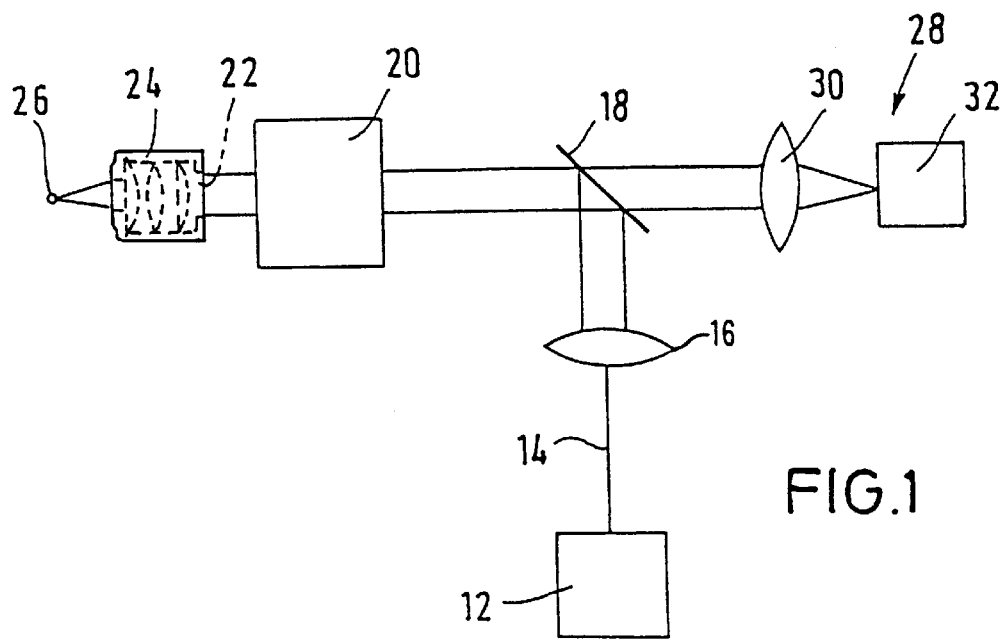
FIG. 1 is a schematic illustration of the beam path between the light source, the observation volume and a detector of a confocal microscope having a deflection mirror arrangement for sampling a sample to be examined by moving the observation volume through the sample.

FIG. 1 is a schematic illustration of the beam path in a confocal microscope 10. The confocal microscope 10 comprises a laser light source 12 transmitting excitation light 14. The excitation light 14 impinges on a conditioning optic 16 expanding and parallelizing the excitation light beam. Behind the conditioning optic 16, the excitation light beam impinges on a dichroic mirror 18 arranged under an angle of 45° to the optical axis of the excitation light 14. The dichroic mirror 18 reflects the excitation light towards deflection mirror arrangement 20 to be explained in connection with FIGS. 2 and 3. From the deflection mirror arrangement 20, the excitation light 14 passes through the mechanical aperture 22 of an objective lens arrangement 24 to be focused thereby in the observation volume 26. In the observation volume 26, the excitation light 14 excites fluorescence in a sample to be examined. This fluorescent light travels through the objective lens arrangement 24 and the deflection mirror arrangement 20 to the dichroic mirror 18 through which it passes to impinge on an observation optic arrangement 28. The observation optic arrangement 28 comprises a lens arrangement 30 and a detector 32.

Figure 2:
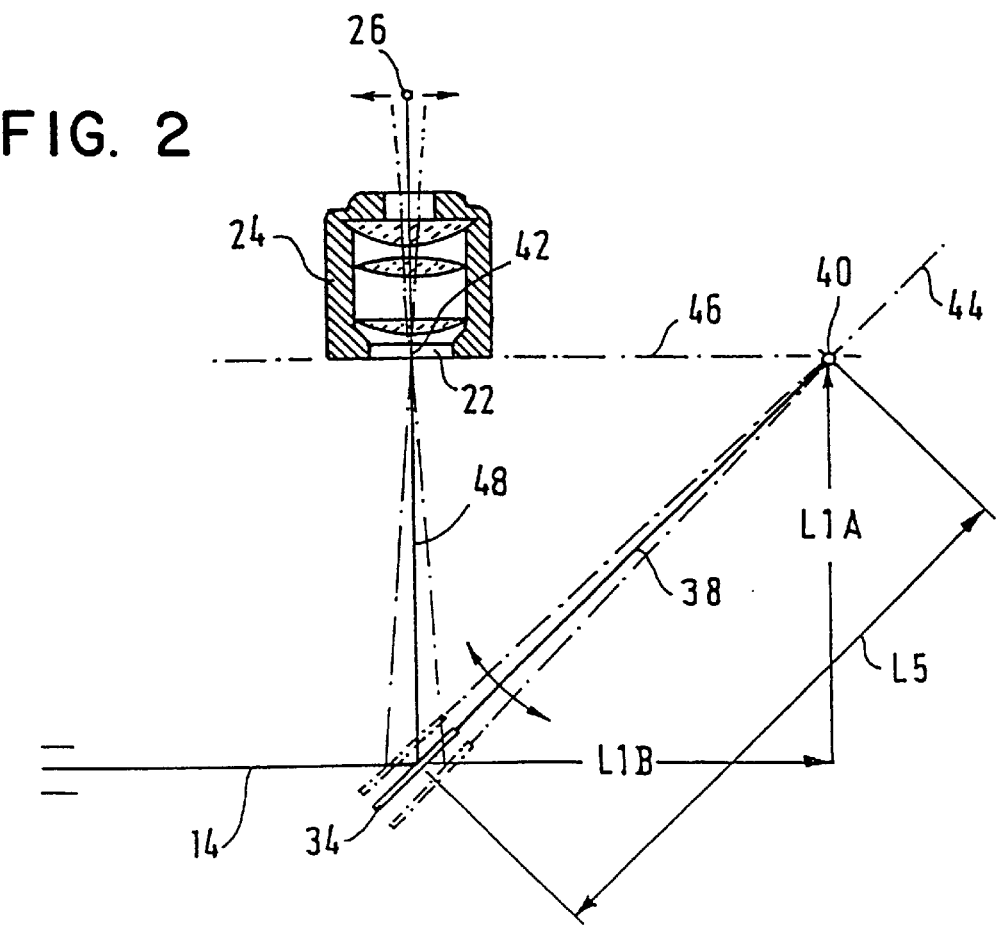
FIG. 2 is a simplified representation of the deflection mirror arrangement for explaining the arrangement of deflection mirror for a one-dimensional movement of the observation volume.

The structure of the deflection mirror arrangement 20 will now be explained with reference to FIGS. 2 and 3. The deflection mirror arrangement 20 comprises two deflection mirrors 34, 36, the deflection mirror 34 facing the objective lens 24 in the beam path (objective-side deflection mirror), while the deflection mirror 36 (deflection mirror on the side off the light source) is disposed between the dichroic mirror 18 and the objective-side deflection mirror 34. FIG. 2 illustrates a lateral view of the representation in FIG. 3, seen in the direction of the arrow II, the deflection mirror 36 on the side of the light source not being shown for reasons of simplicity. As may be seen in FIG. 2, the excitation light 14 impinges under an angle of substantially 45° on the objective-side deflection mirror 34 that reflects the excitation light towards the objective lens arrangement 24, where it passes through the aperture 22. The objective-side deflection mirror 34 is planar and disposed on an arm 38 oscillating to an from about an oscillation axis 40. Due to the oscillation of the deflection mirror 34 by about ±2° around the normal position (45° orientation with respect to the incident excitation light 14), the deflection of the excitation light varies, with the optical axes of the respective reflected excitation light intersecting at the intersection 42. This intersection 42 is situated just behind the aperture 22 of the objective lens arrangement 24. To achieve this, the oscillation axis 40 is situated within the plane 44 defined by the planar mirror 34. Moreover, the oscillation axis 40 lies in the plane 46 extending vertical to the excitation light 48 when the deflection mirror 34 is in its normal position. In other words: the oscillation axis 40 coincides with the line of intersection of the planes 44 and 46.

The mirror 36 on the side of the light source is arranged in exactly the same manner with respect to the mirror 34. That means that the deflection mirror 36 is mounted on an arm 50 oscillating about an oscillation axis 52. This oscillation axis 52 is the line of intersection between the plane 54 defined by the planar deflection mirror 34 and the plane 56 extending through the common intersection 58 of the light reflected when the deflection mirror 36 is oscillated and being vertical to the reflected light 60 when the deflection mirror 36 is in the normal position. In other words: the oscillation axis 52 coincides with the line of intersection of the planes 54 and 56.

The two deflection mirrors 34 and 36 of the deflection mirror arrangement 20 may be circular or elliptic, the edges being approximated by progression or round. FIG. 3 depicts objective-side and light source side deflection mirrors 34 and 36 having a elliptical shape and connected to arms 38 and 50 respectively.

Figure 4:
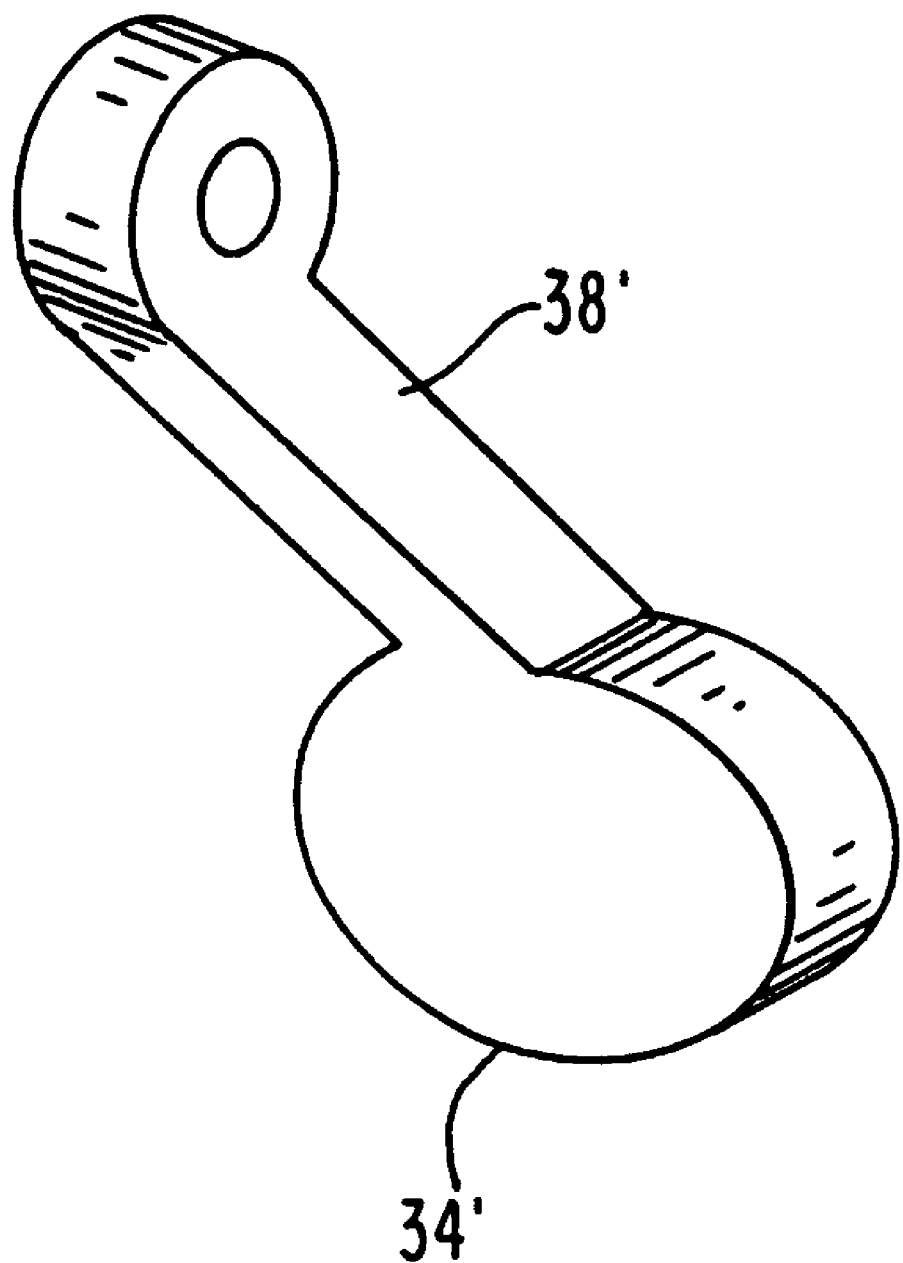
FIG. 4 illustrates a deflection mirror having a circular shape.

FIG. 4 illustrates an objective-side deflection mirror 34 (only one of the two deflection mirror is shown for convenience) having a circular shape and connected to arm 38. The two deflection mirrors 34 and 36 are driven in particular by linear harmonic vibrations (for example sinusoidal, rectangular, triangular, saw-tooth). Such drives are known per se. The frequency, the amplitude and the phase relation with which the two deflection mirrors 34 and 36 oscillate may be adjusted separately. When these parameters are varied in certain relations, Lissajous figures may be generated that scan the entire area to be examined (sample). These figures are entirely documented mathematically and may be taken in consideration for analysis.

Figure 3:
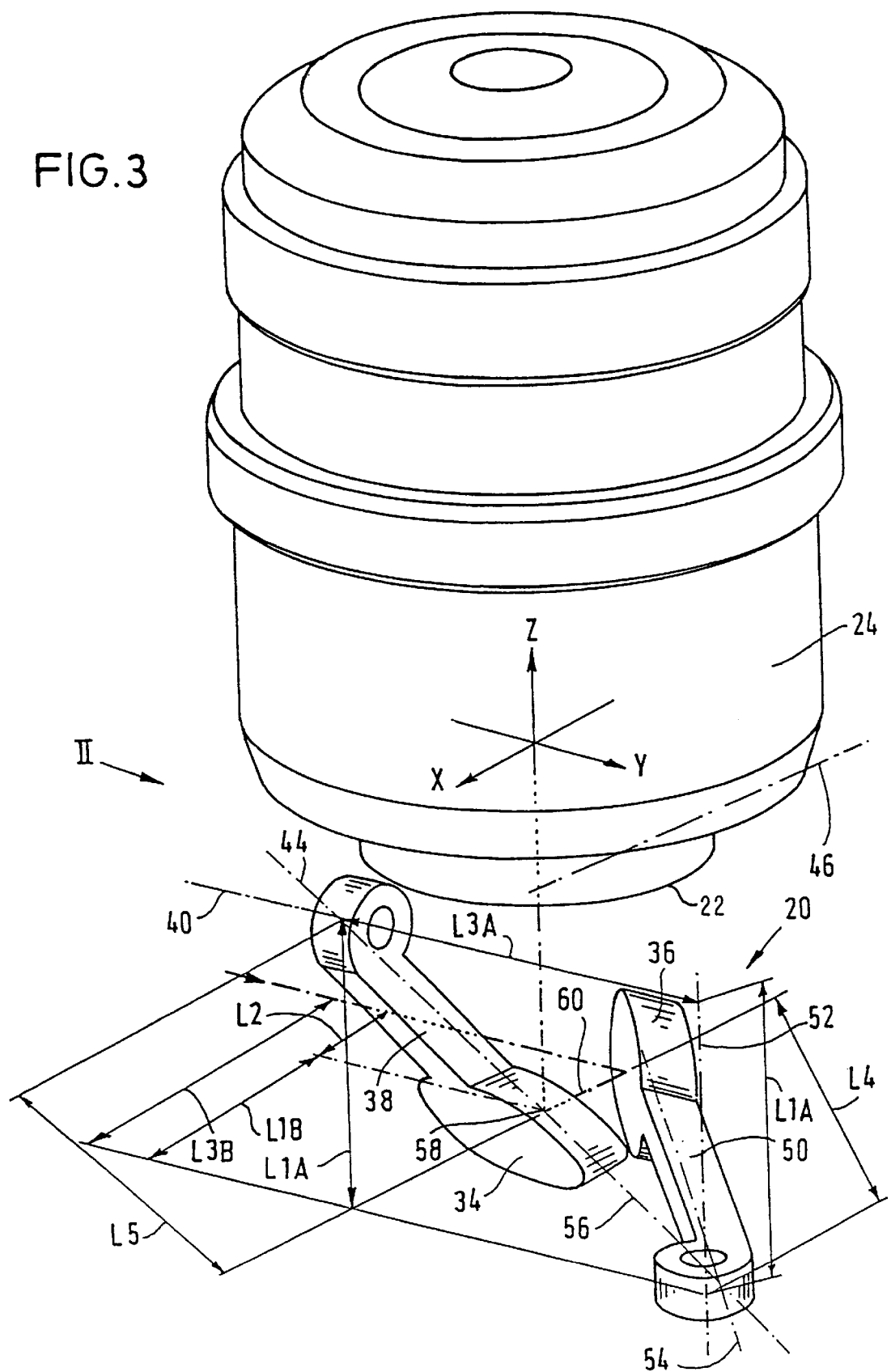
FIG. 3 is a perspective representation of the two deflection mirrors in elliptical shape and the objective lens arrangement.

The relative dimensions of the lengths of the arms 38, 50, the arrangement and spacing of the two oscillation axes 40 and 52, are represented by the distances shown in FIG. 3, where spaces and distances of equal length have the same reference numerals. The following relations apply:

L1A=L1B

L1A=L3B

L3B=L1B+L2

L4=√2·L3A

L5=√2·L1B.

What is claimed is:

1. A confocal microscope for optical detection of an observation volume, comprising:

a light source generating excitation light, a dichroic mirror reflecting the excitation light impinging thereon from the light source, an objective lens arrangement with a mechanical aperture connected thereto receiving the excitation light reflected by the dichroic mirror and focusing the light on the observation volume, and an observation lens arrangement receiving light coming from the observation volume and passing through the dichroic mirror, wherein, between the dichroic mirror and the mechanical aperture of the objective lens arrangement, a deflection mirror arrangement is located having a first planar deflection mirror on the side of the objective lens, and wherein said first deflection mirror oscillates about the normal position and deflects said reflective excitation light under any angle of incidence, so that it impinges at a substantially common part within said mechanical aperture.

2. The confocal microscope of claim 1, further including a second planar mirror on the side of the light source, wherein, upon oscillation of the second planar deflection mirror, optical axes of the reflected excitation light intersect in a substantially common intersection in the area of the plane defined by the first planar deflection mirror, and wherein, when the second planar deflection mirror is in its normal position, the oscillation axis of the second planar deflection mirror coincides with a line of intersection of the plane defined by the second planar deflection mirror and a plane extending through and perpendicular to the common intersection of the optical axes of the reflected excitation light.

3. The confocal microscope of claim 2, wherein at least one of said first and second planar deflection mirrors is oscillated by up to 5° on either side of its normal position.

4. The confocal microscope claim 1, wherein said first planar deflection mirror is designed as an ellipse with a longitudinal axis and a normal axis perpendicular thereto and having a round or polygonal edge shape.

5. The confocal microscope of claim 2, wherein at least one of said first and second planar deflection mirrors is substantially circular.

6. The confocal microscope of claim 1, wherein the light source is a laser light source.

7. The confocal microscope of claim 2, wherein each planar deflection mirror is designed as an ellipse with a longitudinal axis and a normal axis perpendicular thereto and having a round or polygonal edge shape, and are arranged such that the longitudinal axes of each planar deflection mirror is mutually shifted by 90° and intersects under an angle of 45° with respect to each other.

8. The confocal microscope of claim 3, wherein each planar deflection mirror is designed as an ellipse with a longitudinal axis and a normal axis perpendicular thereto and having a round or polygonal edge shape, and are arranged such that the longitudinal axes of each planar deflection mirror is mutually shifted by 90° and intersects under an angle of 45° with respect to each other.

9. The confocal microscope of claim 2, wherein each planar deflection mirror is substantially circular.

10. The confocal microscope of claim 3, wherein each planar deflection mirror is substantially circular.

11. The confocal microscope of claim 2, wherein the light source is a laser light source.

12. The confocal microscope of claim 3, wherein the light source is a laser light source.

13. The confocal microscope of claim 4, wherein the light source is a laser light source.

14. The confocal microscope of claim 5, wherein the light source is a laser light source.

15. The confocal microscope of claim 1, wherein the first planar deflection mirror oscillates about a normal position so that, upon oscillation of the first planar deflection mirror, optical axes of the reflected excitation light intersect in a substantially common intersection within the mechanical aperture of the objective lens arrangement, and so that, when the first planar deflection mirror is in its normal position, the oscillation axis of the first planar deflection mirror coincides with a line of intersection of the plane in which the first planar deflection mirror lies, and a plane extending through and perpendicular to the common intersection of the optical axes of the reflected excitation light.

16. The confocal microscope of claim 2, wherein at least one of said first and second planar deflection mirrors is oscillated to no more than 3° on either side of its normal position.

17. The confocal microscope of claim 2, wherein at least one of said first and second planar deflection mirrors is oscillated to no more than 2° on either side of its normal position.

18. The confocal microscope of claim 1, wherein a conditioning optic is arranged between the light source and the dichroic mirror for collimating and expanding the excitation light.

19. The confocal microscope of claim 1, wherein said first planar deflection mirror is oscillated by up to about 5° on either side of its normal position.

20. The confocal microscope of claim 1, wherein said first planar deflection mirror is substantially circular.

21. The confocal microscope of claim 1, wherein said first planar deflection mirror is oscillated to no more than 3° on either side of its normal position.

22. The confocal microscope of 1, wherein said first planar deflection mirror is oscillated to no more than 2° on either side of its normal position.

* * * * *